United States Patent
Kalmykov

(10) Patent No.: US 11,402,890 B1
(45) Date of Patent: Aug. 2, 2022

(54) SYSTEMS AND METHODS FOR COMMUNICATING WITH A DEVICE IN A LOW POWER MODE

(71) Applicant: Spotify AB, Stockholm (SE)

(72) Inventor: Viacheslav Kalmykov, Åkersberga (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 17/224,928

(22) Filed: Apr. 7, 2021

Related U.S. Application Data

(60) Provisional application No. 63/157,398, filed on Mar. 5, 2021.

(51) Int. Cl.
G06F 1/3206 (2019.01)
H04L 67/14 (2022.01)
H04L 67/025 (2022.01)
H04L 12/28 (2006.01)

(52) U.S. Cl.
CPC ............ *G06F 1/3206* (2013.01); *H04L 67/14* (2013.01); *H04L 12/2807* (2013.01); *H04L 67/025* (2013.01); *H04L 2012/2849* (2013.01)

(58) Field of Classification Search
CPC ....... G06F 1/3206; G06F 3/167; H04L 67/14; H04L 12/2807; H04L 67/025; H04L 2012/2849; H04L 67/303; H04L 41/12; H04N 21/47217; H04N 21/472; G10L 15/22; G10L 15/08; G10L 2015/088; G10L 2015/223
See application file for complete search history.

(56) References Cited

U.S. PATENT DOCUMENTS

| | | | |
|---|---|---|---|
| 9,244,516 B2 * | 1/2016 | Gossain .............. | G06F 1/3206 |
| 10,827,028 B1 * | 11/2020 | Bromand ............. | H04L 67/303 |
| 2011/0255454 A1 * | 10/2011 | Hauser ................. | H04W 88/04 |
| | | | 375/211 |

(Continued)

OTHER PUBLICATIONS

Asustor, Remotely wake up your NAS with wake on WAN, Copyright © 2021 ASUSTOR Inc., downloaded from https://www.asustor.com/solution/wake_on_wan, Feb. 19, 2021, 13 pgs.

(Continued)

*Primary Examiner* — Philip J Chea
*Assistant Examiner* — Mohammed Ahmed
(74) *Attorney, Agent, or Firm* — Morgan, Lewis & Bockius LLP

(57) ABSTRACT

A first server system is configured to communicate with a first client device through a first application executing on the first client device. The first server system determines that communication with the first client device through the first application has been lost due to the first client device entering an idle mode. The first server system receives a request from a second client device that triggers reestablishing communication with the first client device through the first application. In response, the first server system transmits a request to a second server system to wake the first client device from the idle mode. The first server system receives, from the first application on the first client device, an indication that communication has been reestablished between the first server system and the first application. The first server system transmits a control command to control the first client device.

13 Claims, 7 Drawing Sheets

(56) References Cited

U.S. PATENT DOCUMENTS

| | | | | |
|---|---|---|---|---|
| 2013/0287012 | A1* | 10/2013 | Pragada | H04W 76/22 370/338 |
| 2014/0068038 | A1* | 3/2014 | Brook | H04L 29/08612 709/223 |
| 2014/0143568 | A1* | 5/2014 | Kim | G06F 1/3287 713/323 |
| 2014/0208132 | A1* | 7/2014 | Cheston | G06F 1/26 713/310 |
| 2015/0095680 | A1* | 4/2015 | Gossain | G06F 1/3209 713/323 |
| 2016/0182243 | A1* | 6/2016 | Garg | H04L 67/145 370/254 |
| 2017/0127302 | A1* | 5/2017 | Fersman | H04W 84/20 |
| 2018/0146833 | A1* | 5/2018 | Halloran | A47L 11/4061 |
| 2018/0242249 | A1* | 8/2018 | Yang | H04W 52/0216 |
| 2019/0312835 | A1* | 10/2019 | Jang | H04L 63/0209 |
| 2020/0103951 | A1* | 4/2020 | Gossain | G06F 1/3206 |
| 2021/0084113 | A1* | 3/2021 | Bromand | G10L 15/22 |
| 2021/0377596 | A1* | 12/2021 | Pipher | H04N 21/4627 |

OTHER PUBLICATIONS

Spotify AB, Extended European Search Report, EP21168173,9, Aug. 27, 2021, 8 pgs.

Torres, Team Viewer's Android Remote Control app now wakes up idle computers, Android Community, Apr. 22, 2016, 1 pg.

\* cited by examiner

500

```
┌─────────────────────────────────────────────────────────────────┐
│   The method (502) is performed at a first server system        │
│   configured to communicate with a first client device through  │
│   a first application executing on the first client device.     │
└─────────────────────────────────────────────────────────────────┘
                                │
                                ▼
┌─────────────────────────────────────────────────────────────────┐
│ Determine (504) that communication with the first client device │
│ through the first application has been lost due to the first    │
│ client device entering an idle mode.                            │
│  ┌───────────────────────────────────────────────────────────┐  │
│  │ Receive (506) a log-out request indicating that a user of │  │
│  │ the second client device is to be logged out of the first │  │
│  │ client device.                                            │  │
│  └───────────────────────────────────────────────────────────┘  │
│  ┌───────────────────────────────────────────────────────────┐  │
│  │ Determine (508) that periodic messages from the first     │  │
│  │ client device to the first server system have ceased.     │  │
│  └───────────────────────────────────────────────────────────┘  │
└─────────────────────────────────────────────────────────────────┘
                                │
                                ▼
┌─────────────────────────────────────────────────────────────────┐
│ After determining that the communication with the first client  │
│ device through the first application has been lost, receive     │
│ (510) a request from a second client device, distinct from the  │
│ first client device, that triggers reestablishing communication │
│ with the first client device through the first application.     │
└─────────────────────────────────────────────────────────────────┘
                                │
                                ▼
┌─────────────────────────────────────────────────────────────────┐
│ In response to the request from the second client device that   │
│ triggers reestablishing communication with the first client     │
│ device through the first application, transmit (512) a request  │
│ to a second server system to wake the first client device from  │
│ the idle mode.                                                  │
│  ┌───────────────────────────────────────────────────────────┐  │
│  │ The request from the second client device that triggers  │  │
│  │ reestablishing communication with the first client device │  │
│  │ indicates (514) that a user has opened, on the second     │  │
│  │ client device, a user interface for selecting a device    │  │
│  │ for presenting media content.                             │  │
│  │  ┌─────────────────────────────────────────────────────┐  │  │
│  │  │ Transmit (516) an instruction back to the second    │  │  │
│  │  │ client device to display the user interface for     │  │  │
│  │  │ selecting the device for presenting media content.  │  │  │
│  │  └─────────────────────────────────────────────────────┘  │  │
│  │  ┌─────────────────────────────────────────────────────┐  │  │
│  │  │ Transmit (518) an instruction back to the second    │  │  │
│  │  │ client device to display an option for selecting    │  │  │
│  │  │ the first client device in the user interface for   │  │  │
│  │  │ selecting the device for presenting media content.  │  │  │
│  │  └─────────────────────────────────────────────────────┘  │  │
│  └───────────────────────────────────────────────────────────┘  │
│                              (A)                                │
└─────────────────────────────────────────────────────────────────┘
```

FIG. 5A

SYSTEMS AND METHODS FOR COMMUNICATING WITH A DEVICE IN A LOW POWER MODE

PRIORITY APPLICATION

This application claims priority to U.S. Provisional App. No. 63/157,398, filed Mar. 5, 2021, which is hereby incorporated by reference in its entirety.

TECHNICAL FIELD

The disclosed embodiments relate generally to communicating with devices in a low power mode, and, more particularly, to waking such devices up from the low power mode.

BACKGROUND

Access to electronic media, such as music and video content, has expanded dramatically over time. As a departure from physical media, media content providers stream media to electronic devices across wireless networks, improving the convenience with which users can digest and experience such content.

In a typical media content casting scenario, a user of a media-providing service may select content on a first device (e.g., a smartphone) to be presented on another device (e.g., a smart speaker or smart television). Some modern presentation devices, however, include a low power mode. When a presentation device goes into a low power mode, the media providing service often loses the ability to communicate directly with the presentation device (otherwise communication between the media providing service and the presentation device would prevent the media presentation device from entering low power mode for prolonged periods of time). This is especially true when the presentation device is a third-party device with respect to the media providing service. Although the user may wake the presentation device by interacting with the presentation device (e.g., by uttering a command such as "Hey Device, play my daily playlist"), a problem arises when the user tries to use the first device (e.g., their smartphone) to issue playback commands to the presentation device. In this case, the first device typically communicates with the media providing service, which is unable to communicate with the presentation device while in the low power mode. Thus, there is a need for improved methods of communicating with devices in a low power mode.

SUMMARY

The problem described above is solved by transmitting a request to a third-party server (e.g., one associated with the presentation device) to wake up the presentation device. In other words, in some embodiments, the media providing service transmits a request to the third-party to wake up their own presentation device. Thus, in some embodiments, only one entity (the third-party) can remotely wake the presentation device, which allows the presentation device to remain in a low power mode for longer periods of time. Once the presentation device exits the low power mode (in response to an instruction from the third-party), it sends a message back to the media providing service indicating that communication has been reestablished. At this point, the media providing service is again able to communicate with the third-party device (e.g., via an embedded software development kit), without requiring that the user directly interact with the presentation device.

In accordance with some embodiments, a method is performed at a first server system configured to communicate with a first client device through a first application executing on the first client device. The method includes determining that communication with the first client device through the first application has been lost due to the first client device entering an idle mode. The method further includes after determining that the communication with the first client device through the first application has been lost, receiving a request from a second client device, distinct from the first client device, that triggers reestablishing communication with the first client device through the first application. The method further includes, in response to the request from the second client device that triggers reestablishing communication with the first client device through the first application, transmitting a request to a second server system to wake the first client device from the idle mode. The method further includes receiving, from the first application on the first client device, an indication that communication has been reestablished between the first server system and the first application. The method further includes after receiving, from the first application on the first client device, the indication that communication has been reestablished between the first server system and the first application, transmitting, to the first application on the first client device, a control command to control the first client device.

In accordance with some embodiments, a first server system configured to communicate with a first client device through a first application executing on the first client device includes one or more processors and memory. The memory stores one or more programs. The one or more programs include instructions for determining that communication with the first client device through the first application has been lost due to the first client device entering an idle mode. The one or more programs further include instructions for, after determining that the communication with the first client device through the first application has been lost, receiving a request from a second client device, distinct from the first client device, that triggers reestablishing communication with the first client device through the first application. The one or more programs further include instructions for, in response to the request from the second client device that triggers reestablishing communication with the first client device through the first application, transmitting a request to a second server system to wake the first client device from the idle mode. The one or more programs further include instructions for receiving, from the first application on the first client device, an indication that communication has been reestablished between the first server system and the first application. The one or more programs further include instructions for, after receiving, from the first application on the first client device, the indication that communication has been reestablished between the first server system and the first application, transmitting, to the first application on the first client device, a control command to control the first client device.

In accordance with some embodiments, a computer-readable storage medium (e.g., a non-transitory computer-readable storage medium) includes one or more programs for execution by a first server system configured to communicate with a first client device through a first application executing on the first client device. The one or more programs include instructions for determining that communication with the first client device through the first application has been lost due to the first client device entering an idle mode. The one or more programs further include instructions for, after determining that the communication with the first client device through the first application has been lost, receiving a request from a second client device, distinct from the first client device, that triggers reestablishing communication with the first client device through the first application. The one or more programs further include instructions for, in response to the request from the second client device that triggers reestablishing communication with the first client device through the first application, transmitting a request to a second server system to wake the first client device from the idle mode. The one or more programs further include instructions for receiving, from the first application on the first client device, an indication that communication has been reestablished between the first server system and the first application. The one or more programs further include instructions for, after receiving, from the first application on the first client device, the indication that communication has been reestablished between the first server system and the first application, transmitting, to the first application on the first client device, a control command to control the first client device.

Thus, systems are provided with improved methods for communicating with a device in a low power mode (e.g., waking the device up from the low power mode). These systems and methods save power by allowing such devices to remain in the low power mode for longer periods of time, while reducing friction in allowing users to select such devices to perform operations (such as media presentation), as described in detail below.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B are flow diagrams illustrating a method of communicating with a device in a low power mode, in accordance with some embodiments.

DETAILED DESCRIPTION

Figure 1:
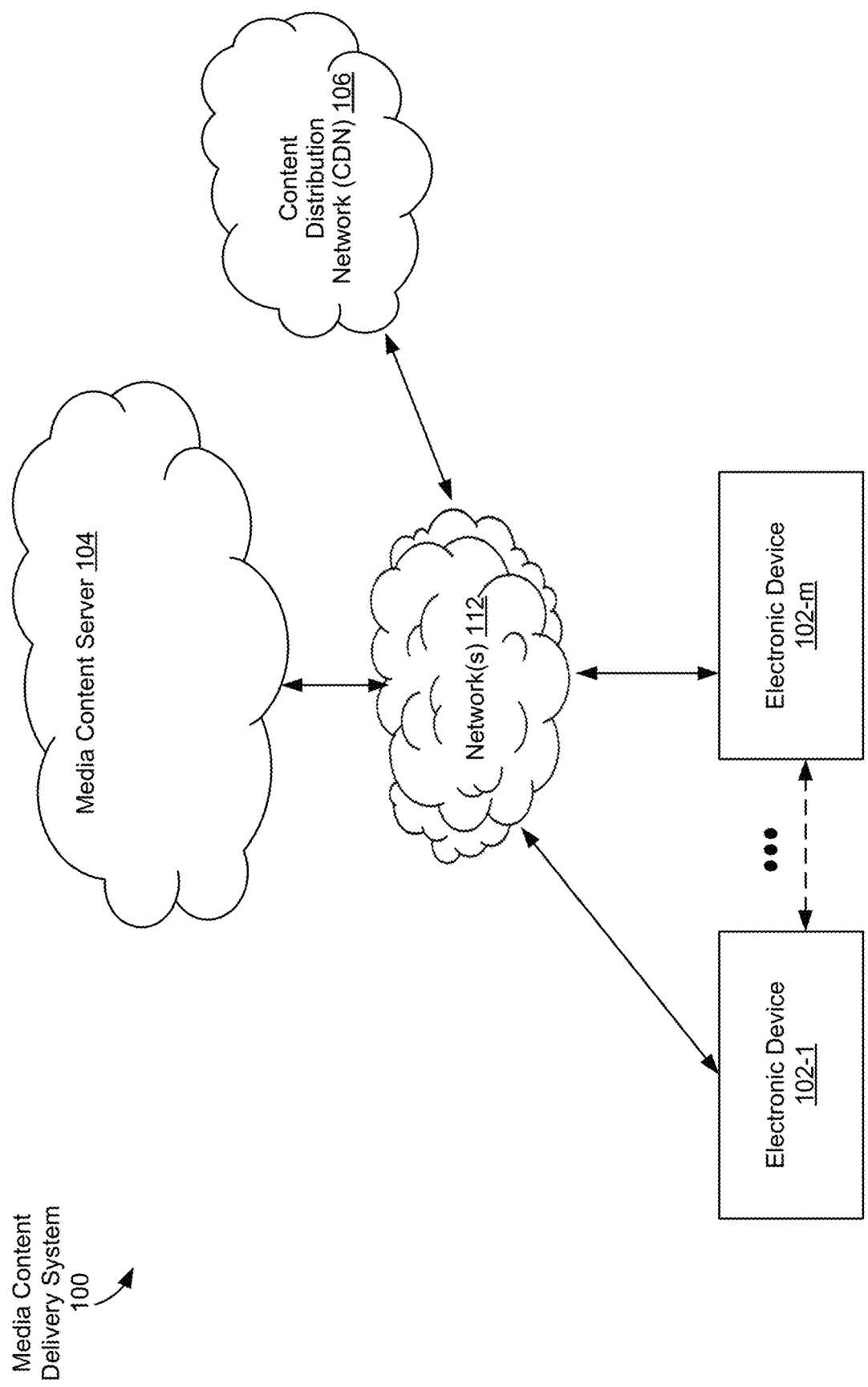
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, an idle mode is a mode entered by a device in response to a period of inactivity (e.g., a period during which services (such as presenting media) are not provided to the user and during which user inputs are not received). In an idle mode, certain services of the device are reduced or unavailable when the device is in the idle mode. For example, in the idle mode, the device may not be able to respond to requests from an application (e.g., SDK or API) running on the device. In some circumstances, the idle mode saves power as compared to normal operation (e.g., the baseline power consumption, when the device is not servicing any user request is lower in the low-power mode than when not in the low-power mode). Thus, an example of an idle mode is a low-power mode (e.g., a mode in which the device consumes a lower baseline amount of power). Note that the disclosed embodiments may also provide benefits other than saving power, for example, in restoring communication after a network outage. Thus, it is not necessary that the idle modes described herein save power.

As used herein, to wake a device from an idle mode (e.g., a low-power mode) means to exit the idle mode (e.g., by restoring or making available the services that were reduced in the idle mode). For example, in some embodiments, waking the device from the idle mode allows the device to respond to requests from an application (e.g., SDK or API) running on the device that the device could not respond to when the device was in the idle mode.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smartphone, digital media player, an in-vehicle infotainment (IVI) system, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API (e.g., voice recognition module 316, FIG. 3), a connect API, and/or key service (e.g., key database 336, FIG. 3). In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer or may be multiple server computers. Moreover, the media content server 104 may be coupled to CDN 106 and/or other servers and/or server systems, or other devices, such as other client devices, databases, content delivery networks (e.g., peer-topeer networks), network caches, and the like. In some embodiments, the media content server 104 is implemented by multiple computing devices working together to perform the actions of a server system (e.g., cloud computing).

Figure 2:
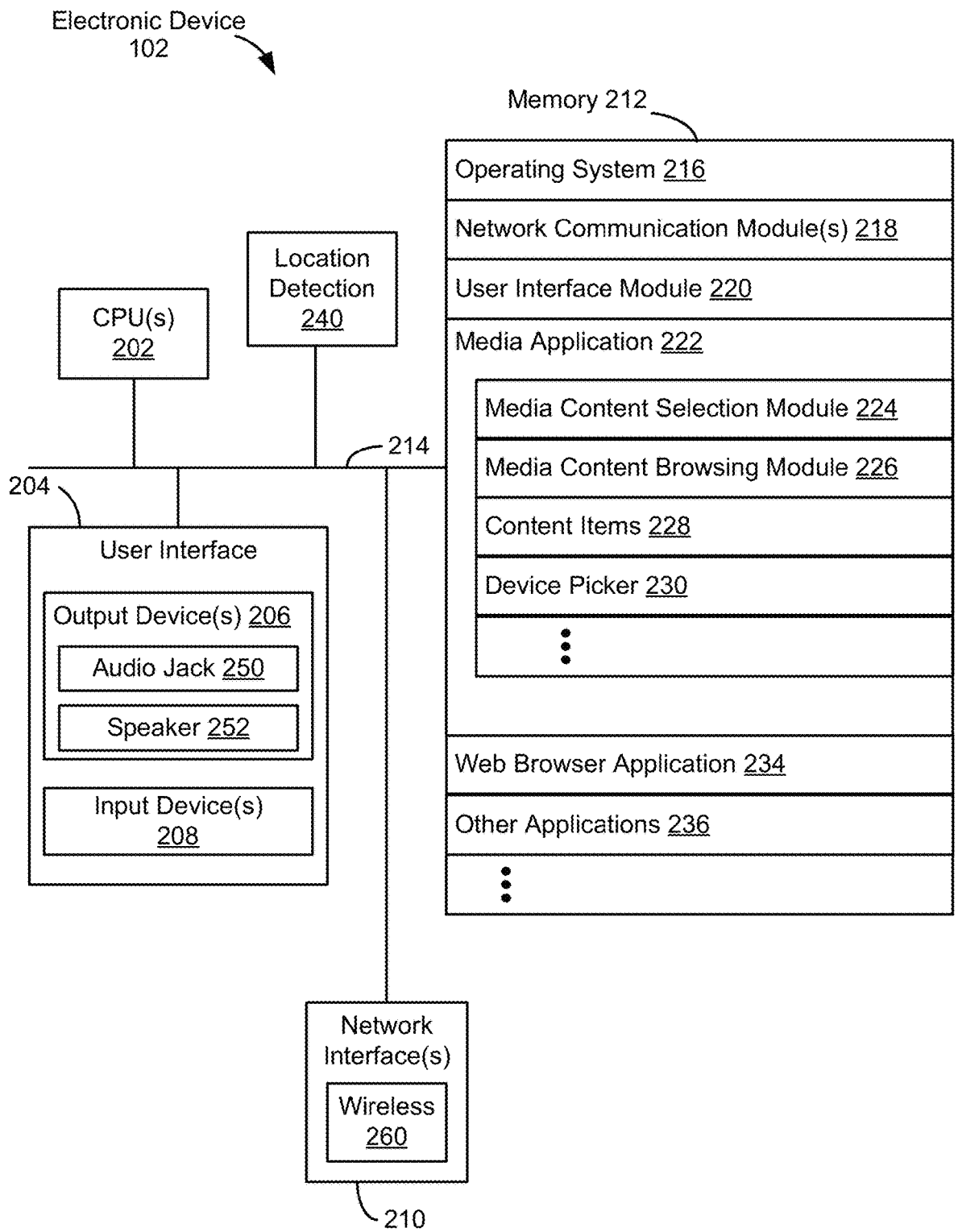
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, Badious) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
    - a media content selection module 224 for selecting one or more media content items and/or sending, to the media content server, an indication of the selected media content item(s);
    - a media content browsing module 226 for providing controls and/or user interfaces enabling a user to navigate, select for playback, and otherwise control or interact with media content, whether the media content is stored or played locally or remotely;
    - a content items module 228 for storing media items for playback and/or for forwarding requests for media content items to the media content server;
    - a device picker 230 (e.g., a user interface) that allows the user to select a presentation device (e.g., a device on which to playback media that is selected via media application 222). In various circumstances, the presentation device may be the same device executing media application 222 (e.g., device 102) or a different device, such as a third-party speaker system;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
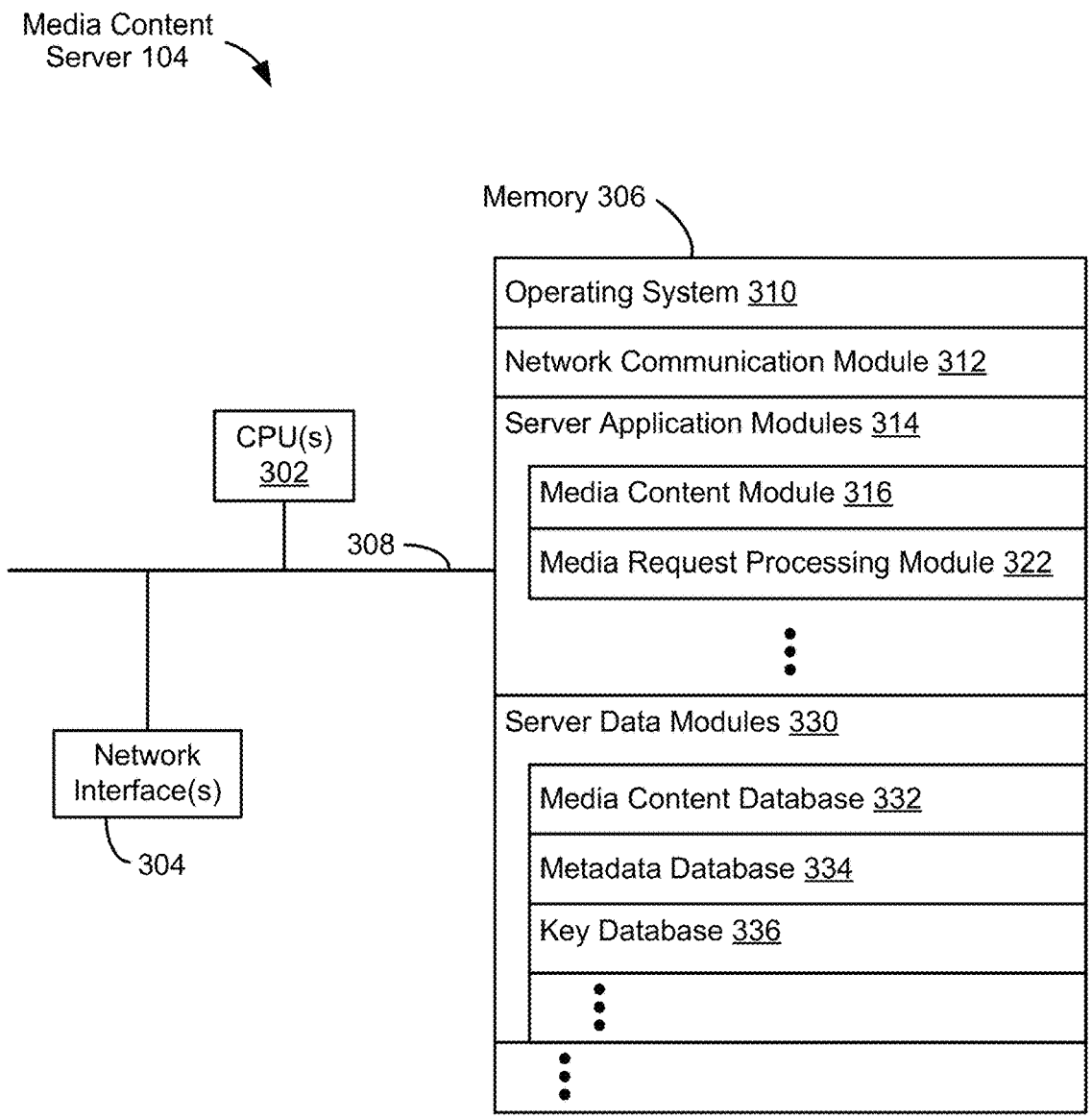
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s); and a media request processing module 322 for processing requests for media content and facilitating access to requested media items by client devices (e.g., the client device 102) including, optionally, streaming media content to such devices and/or to one or more media presentation system(s) 108;

one or more server data module(s) 330 for handling the storage of and/or access to media items and/or metadata relating to the media items; in some embodiments, the one or more server data module(s) 330 include:

a media content database 332 for storing media items;
a metadata database 334 for storing metadata relating to the media items; and
a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
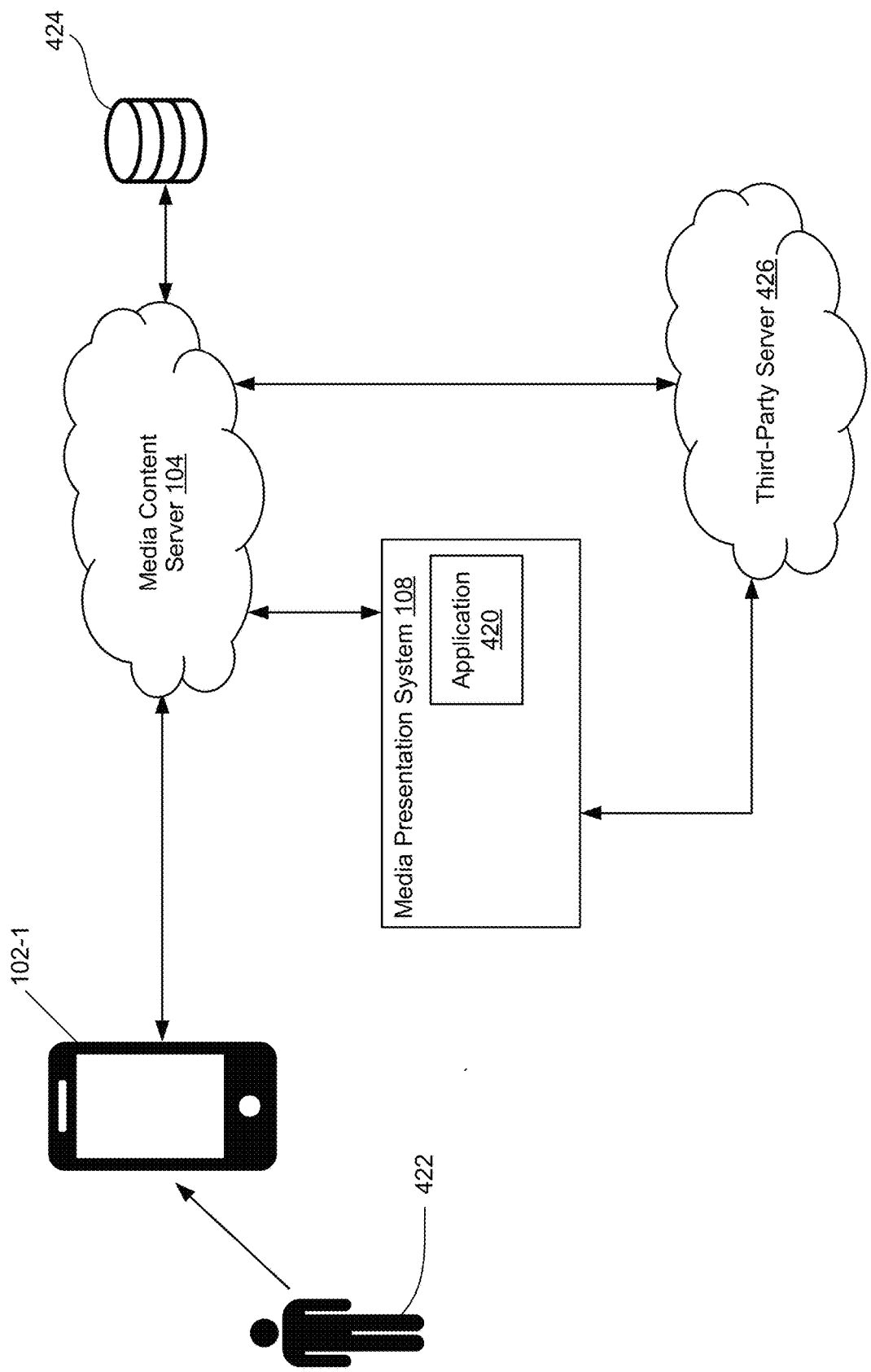
FIG. 4A is a block diagram illustrating media content delivery to a third-party client device, in accordance with some embodiments.

FIG. 4A is a block diagram illustrating media content delivery to a media presentation system 108 (e.g., a smart speaker, also referred to as a personal assistant device, a smart television, a headset, etc.) associated with a third-party server 426, in accordance with some embodiments. (Note that media presentation system 108 is an instance of the client devices 102 described with respect to FIG. 1.) In particular, FIG. 4A illustrates a process for waking the media presentation system 108 from a low power mode (an example of an idle mode) through third-party server 426 (which maintains some ability to communicate with media presentation system 108 even when media presentation system 108 is in the low power mode).

Note the devices in FIG. 4A may communicate through any type of network (e.g., networks 112, FIG. 1). For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, media content server 104 is a server for a media providing service (e.g., for streaming media). Under normal operations (e.g., when the media presentation system 108 is not in a low power mode), media content server 104 communicates with media presentation system 108 via an application 420 installed on the media presentation system 108. For example, media presentation system 108 is linked to an account of user 422 through application 420 (client device 102-1 is linked to the same account through media application 222). In a typical scenario, a user 422 of client device 102-1 selects, using media application 222 (FIG. 2), media content (e.g., audio tracks) to be played back. User 422 also selects, device via device picker 230, media presentation system 108 as the presentation device. Media content server 104 keeps track of which user is active on media presentation system 108 by logging that user into media presentation system 108 at backend 424. Media content server 104 also transmits instructions to media presentation system 108 to present the selected media content. In some embodiments, media presentation system 108 retrieves the selected media from a content distribution network 106 (FIG. 1).

In some circumstances, media presentation system 108 enters a low power mode (e.g., without user intervention, based on a period of inactivity). In the low power mode, media content server 104 is not capable of communicating directly with application 420 because media presentation system 108 is essentially turned off from the viewpoint of media content server 104 (e.g., communication between media content server 104 and application 420 is terminated when media presentation system 108 enters the low power mode). More particularly, media presentation system 108 is not capable of waking media presentation system 108 from the low power mode by directly communicating with application 420, because to maintain such direct communication between application 420 and media content server 104 (e.g., without going through third-party server 426, as described below) would prevent media presentation system 108 from entering the low power mode in the first place.

Media content server 104 determines that the media presentation system has entered the low power mode. For example, in some embodiments, when in normal operation, application 420 sends periodic messages (e.g., pings) to media content server 104. In some embodiments, the media content server 104 determines that these periodic messages have ceased, and thus determines that media presentation system 108 is (at best) in a low power mode. As another example, in some embodiments, application 420 sends media content server 104 a message explicitly informing the media content server 104 that media presentation system 108 has entered the low power mode. In some embodiments, the message explicitly informing the media content server 104 that media presentation system 108 has entered the low power mode is a request to log user 422 out of media presentation system 108.

At some point later, media content server 104 receives a request from client device 102-1 that triggers reestablishing communication with the media presentation system 108 (or at least attempting to reestablish communication, as media content server 104 may not know whether media presentation system 108 is in a low power mode or turned off completely). In some embodiments, the request is based on a user interaction with the client device 102-1 (e.g., a user interaction with media application 222). For example, the request that triggers reestablishing communication with the media presentation system 108 may result from the user 422 opening media application 222 (e.g., bringing media application 222 to the foreground of the client device 102-1), or opening device picker 230, or requesting to play media content. For example, the user 422 may have paused media content playing back on media presentation system 108 for a sufficiently long time such that media presentation system 108 entered a low power mode, and the request that triggers reestablishing communication with the media presentation system 108 is based on the user requesting to resume (un-pause) the media content.

In response to the request from client device 102-1, media content server 104 sends a request to third-party server 426 to wake the media presentation system 108 from the low power mode. As noted above, third-party server 426 maintains some ability to communicate with media presentation system 108 even when media presentation system 108 is in the low power mode, and, more particularly, maintains an ability to wake media presentation system 108 from the low power mode. In response to request to wake media presentation system 108 from the low power mode, third-party server 426 does so (e.g., by sending a message to media presentation system 108 that wakes media presentation system 108). Upon media presentation system 108 waking, application 420 sends an indication to media content server 104 indicating that communication with the media presentation system 108 has been reestablished. Thus, rather than maintaining constant periodic communication with media presentation system 108, which would prevent media presentation system 108 from entering a low power mode, media content server 104 wakes media presentation system 108 by sending messages that go through third-party server 426.

After waking media presentation system 108, media content server can once again transmit playback commands to application 420 to cause media presentation system 108 to present media content.

Figure 4B:
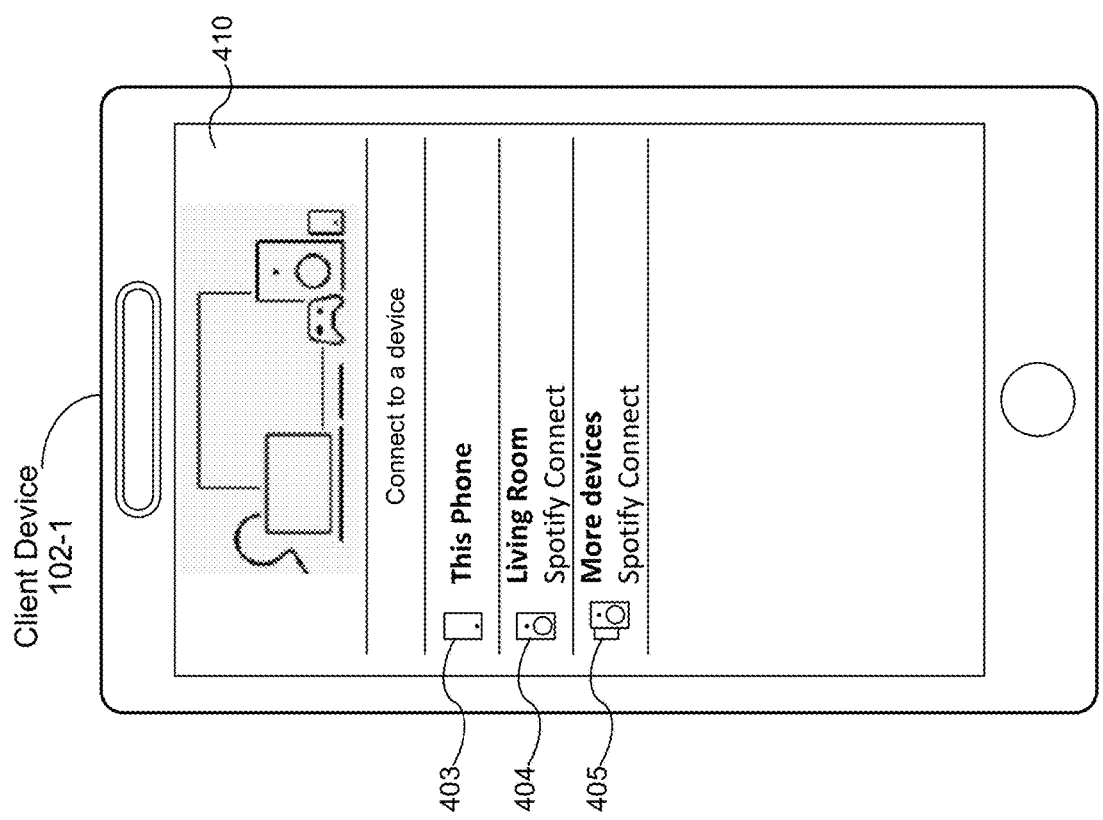
FIG. 4B illustrates a graphical user interface (e.g., device picker) displayed by a display of a client device, in accordance with some embodiments.

FIG. 4B illustrates a graphical user interface 410 displayed by a display of a client device 102-1 associated with a user (e.g., Sara). In some embodiments, the graphical user interface on device 102 includes a device selection portion 402 (e.g., a device picker). The device selection portion 402 includes user interface objects that correspond to one or more presentation devices, such as "This Phone" 403, "Living Room" 404 (e.g., which may correspond to media presentation system 108), and "More devices" 405. In some embodiments, the device 102-1 receives a user input at a location that corresponds to a presentation device user interface object in the device selection portion 402 to select a presentation device for presentation of the media content (e.g., received by device 102-1 from media content server 104). For example, the device receives a user input (e.g., from Sara) at a location corresponding to the displayed user interface object labeled "This Phone" 403 to select client device 102-1 as the presentation device. In this manner, client device 102-1 is selected as the playback device.

Figure 5B:
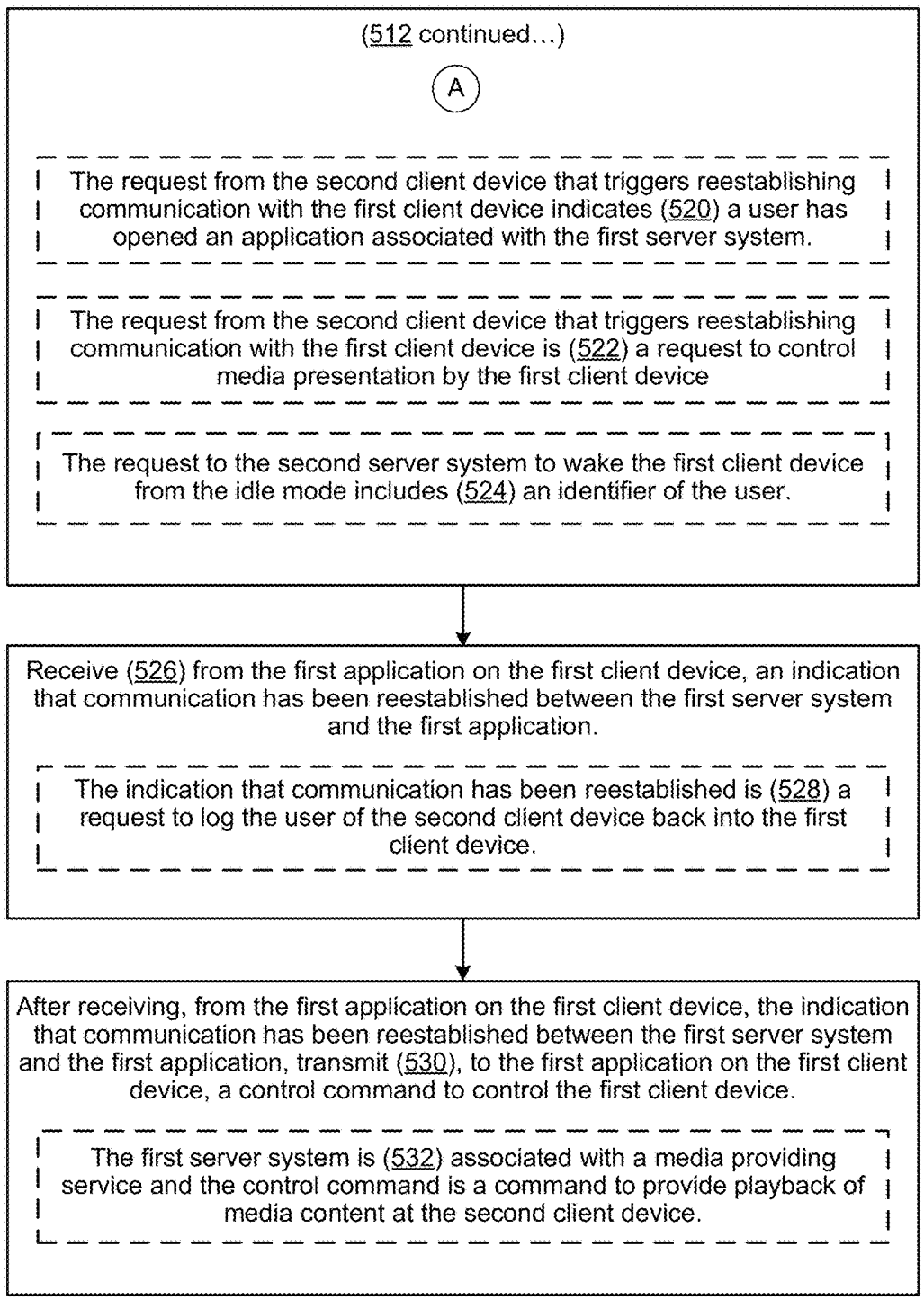

FIGS. 5A-5B are flow diagrams illustrating a method 500 of communicating with a device in a low power (e.g., idle) mode, in accordance with some embodiments. Method 500 may be performed (502) at a first server system (e.g., media content server 104) configured to communicate with a first client device (e.g., media presentation system 108) through a first application (e.g., application 420) executing on the first client device. In some embodiments, the first client device includes one or more speakers (e.g., the first client device is a smart speaker). In some embodiments, the first client device includes a display (e.g., the first client device is a smart television, a headset, etc.) In some embodiments, the method 500 is performed by executing instructions stored in the memory (e.g., memory 306, FIG. 3) of the first server system. In some embodiments, the method 500 is performed by a combination of the server system (e.g., including media content server 104 and CDN 106) and an electronic device (e.g., a client device). In some embodiments, the server system provides tracks (e.g., media items) for playback to the electronic device(s) 102/108 of the media content delivery system 100.

As described in greater detail below, method 500 obviates the need for the first server system to maintain constant (e.g., periodic) contact with the first client device, which would otherwise prevent the first client device from entering a low power mode. Thus, method 500 conserves power while simultaneously reducing friction when communications need to be reestablished between the first server system and the first client device.

The first server system determines (504) that communication with the first client device through the first application has been lost due to the first client device entering an idle mode (e.g., a low power mode). In some embodiments, the first client device is a media presentation system. In some embodiments, the first application is an embedded in firmware of the first client device. In some embodiments, the first application include an application programming interface (API). In some embodiments, the first application is a software development kit (eSDK) embedded in firmware of the first client device (e.g., the first application is "embedded" on the media presentation system 108). In some embodiments, the eSDK is integrated with firmware on the media presentation system 108. As will be apparent to one of skill in the art, configuring the first client device to communicate with the first server system (e.g., by embedding the first application in the firmware of the first client device) alleviates difficulties in the technical process of discovering local devices for media playback (e.g., so that such devices may be shown in a device picker 230).

In some embodiments, determining that communication with the first client device through the first application has been lost due to the first client device entering an idle mode includes receiving (506) a message from application 420 explicitly informing the media content server 104 that the first client device has entered the idle mode. In some embodiments, determining that communication with the first client device through the first application has been lost due to the first client device entering an idle mode includes receiving (506) (e.g., from application 420) a log-out request indicating that a user of the second client device is to be logged out of the first client device. In some embodiments, the method 500 includes, after determining that communication with the first client device through the first application has been lost due to the first client device entering an idle mode, logging the user of the second client device out of the first client device (e.g., at backend 424, FIG. 4A).

In some embodiments, in normal operation (e.g., when the first client device is not in the idle mode), the first application sends periodic messages (e.g., "pings") to the first server system. In some embodiments, determining that communication with the first client device through the first application has been lost includes determining (508) that periodic messages from the first client device to the first server system have ceased (e.g., that a predefined number of scheduled pings have not arrived, or that no pings have been received for a predefined amount of time).

In some embodiments, the first server system is not capable of communicating (e.g., directly) with the first application when the first client device is in the idle mode. In some embodiments, the first server system is not capable of communicating (e.g., directly) with the first client device when the first client device is in the idle mode. Preventing the first server system from communicating directly with the first client device (e.g., through an eSDK) allows the first client device to remain in the idle mode for longer periods of time, thus saving power.

After determining that the communication with the first client device through the first application has been lost (e.g., at some later time), the first server system receives (510) a request from a second client device, distinct from the first client device (e.g., client device 102-1, FIG. 4A, distinct from the first client device), that triggers reestablishing communication with the first client device through the first application.

In response to the request from the second client device that triggers reestablishing communication with the first client device through the first application, the first server system transmits (512) a request to a second server system (e.g., third-party server 426) to wake the first client device from the idle mode. In some embodiments, the second server system maintains the ability to communicate with the first client device when the first client device is in the idle mode (e.g., maintains the ability to wake the first client device from the idle mode). In some embodiments, the second server system is the only server system that maintains the ability to communicate with the first client device when the first client device is in the idle mode. By transmitting a message to the second server system to wake the first client device from the idle mode, method 500 maintains the benefit of allowing the first client device to be "discoverable" (e.g., such that a user can select the first client device as a presentation device through a device picker 230), while at the same time allowing the first client device to remain in the idle mode for as long as possible, thus saving power.

In some embodiments, the request that triggers reestablishing communication with the first client device is based on a user interaction at the second client device. In some embodiments, the request the triggers reestablishing communication with the first client device is based on a user interaction, on the second client device, with an application associated with the first server system (e.g., a media application 222 associated with media content server 104). In some embodiments, the request that triggers reestablishing communication with the first client device is provided in response to the user interaction. Allowing a user to wake the first client device through interaction with the second client device eliminates the need for the user to directly interact with the first client device in order to wake the first client device, reducing friction during the process of local device discovery, while providing the aforementioned benefits with respect to keeping the first client device in the idle mode whenever possible.

In some embodiments, the request from the second client device that triggers reestablishing communication with the first client device indicates (514) that a user has opened, on the second client device, a user interface for selecting a device for presenting media content (e.g., a device picker). In some embodiments, in response to the request from the second client device that triggers reestablishing communication with the first client device, the first server system transmits (516) an instruction back to the second client device to display the user interface for selecting the device for presenting media content. In some embodiments, in response to the request from the second client device that triggers reestablishing communication with the first client device, the first server system transmits (518) an instruction back to the second client device to display an option for selecting the second client device in the user interface for selecting the device for presenting media content (e.g., the device picker displays the first client device as an option only once communication with the first client device has been reestablished).

In some embodiments, the request from the second client device that triggers reestablishing communication with the first client device indicates (520) a user has opened an application associated with the first server system (e.g., media application 222). For example, a user may open the application by launching the application in the first instance, or by bringing the application to the foreground (e.g., of client device 102-1).

In some embodiments, the request from the second client device that triggers reestablishing communication with the first client device is (522) a request to control media presentation by the first client device (e.g., a request to present media content or to resume presentation of media content).

In some embodiments, the request to the second server system to wake the first client device from the idle mode includes (524) an identifier of the user. In some embodiments, the request from the second server system to wake the first client device includes an identifier of the first client device. In some embodiments, the identifier of the first client device is based on a usage history of the user. For example, although the user is logged out of the first client device, the first server system keeps track of which presentation devices the user has previously been logged into (e.g., within the last hour, day, or week). In response to the user opening the device picker, the first server system attempts to reestablish communication with the presentation devices that the user has previously logged into (e.g., by performing method 500).

The first server system receives (526), from the first application on the first client device, an indication that communication has been reestablished between the first server system and the first application. In some embodiments, the indication that communication has been reestablished includes the identifier of the user. In some embodiments, the indication that communication has been reestablished is (528) a request to log the user of the second client device back into the first client device. In some embodiments, the instruction back to the second device (operation 518) to display the option for selecting the first client device as the presentation device is transmitted in response to receiving the indication that communication has been reestablished.

In some embodiments, after receiving, from the first application on the first client device, the indication that communication has been reestablished between the first server system and the first application, the first server system transmits (530), to the first application on the first client device, a control command to control the first client device.

In some embodiments, the first server system is associated with a media providing service and the control command is (532) a command to provide playback of media content at the second client device (e.g., a command to play or resume content, fast forward, begin a new track, etc.).

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a first server system configured to communicate with a first client device through a first application executing on the first client device:
determining that communication with the first client device through the first application has been lost due to the first client device entering an idle mode;
after determining that the communication with the first client device through the first application has been lost, receiving a request from a second client device, distinct from the first client device, that triggers reestablishing communication with the first client device through the first application;
in response to the request from the second client device that triggers reestablishing communication with the first client device through the first application, transmitting a request to a second server system to wake the first client device from the idle mode;
receiving, from the first application on the first client device, an indication that communication has been reestablished between the first server system and the first application; and
after receiving, from the first application on the first client device, the indication that communication has been reestablished between the first server system and the first application, transmitting, to the first application on the first client device, a control command to control the first client device.

2. The method of claim 1, wherein the request from the second client device that triggers reestablishing communication with the first client device indicates that a user has opened, on the second client device, a user interface for selecting a device for presenting media content.

3. The method of claim 2, further including, in response to the request from the second client device that triggers reestablishing communication with the first client device, transmitting an instruction back to the second client device to display the user interface for selecting the device for presenting media content.

4. The method of claim 2, further including, in response to the request from the second client device that triggers reestablishing communication with the first client device, transmitting an instruction back to the second client device to display an option for selecting the first client device in the user interface for selecting the device for presenting media content.

5. The method of claim 1, wherein the request from the second client device that triggers reestablishing communication with the first client device indicates a user has opened an application associated with the first server system.

6. The method of claim 1, wherein the request from the second client device that triggers reestablishing communication with the first client device is a request to control media presentation by the first client device.

7. The method of claim 1, wherein the first server system is associated with a media providing service and the control command is a command to provide playback of media content at the second client device.

8. The method of claim 1, wherein determining that communication with the first client device through the first application has been lost due to the first client device entering an idle mode includes receiving a log-out request indicating that a user of the second client device is to be logged out of the first client device.

9. The method of claim 8, wherein the indication that communication has been reestablished is a request to log the user of the second client device back into the first client device.

10. The method of claim 8, wherein the request to the second server system to wake the first client device from the idle mode includes an identifier of the user.

11. The method of claim 1, wherein determining that communication with the first client device through the first application has been lost comprises determining that periodic messages from the first client device to the first server system have ceased.

12. A first server system configured to communicate with a first client device through a first application executing on the first client device, comprising:
   one or more processors; and
   memory storing one or more programs, the one or more programs including instructions for:
      determining that communication with the first client device through the first application has been lost due to the first client device entering an idle mode;
      after determining that the communication with the first client device through the first application has been lost, receiving a request from a second client device, distinct from the first client device, that triggers reestablishing communication with the first client device through the first application;
      in response to the request from the second client device that triggers reestablishing communication with the first client device through the first application, transmitting a request to a second server system to wake the first client device from the idle mode;
      receiving, from the first application on the first client device, an indication that communication has been reestablished between the first server system and the first application; and
      after receiving, from the first application on the first client device, the indication that communication has been reestablished between the first server system and the first application, transmitting, to the first application on the first client device, a control command to control the first client device.

13. A non-transitory computer-readable storage medium storing instructions, which, when executed by a first server system configured to communicate with a first client device through a first application executing on the first client device, cause the first server system to perform a set of operations, comprising:
   determining that communication with the first client device through the first application has been lost due to the first client device entering an idle mode;
   after determining that the communication with the first client device through the first application has been lost, receiving a request from a second client device, distinct from the first client device, that triggers reestablishing communication with the first client device through the first application;
   in response to the request from the second client device that triggers reestablishing communication with the first client device through the first application, transmitting a request to a second server system to wake the first client device from the idle mode;
   receiving, from the first application on the first client device, an indication that communication has been reestablished between the first server system and the first application; and
   after receiving, from the first application on the first client device, the indication that communication has been reestablished between the first server system and the first application, transmitting, to the first application on the first client device, a control command to control the first client device.

* * * * *